Figure 1:
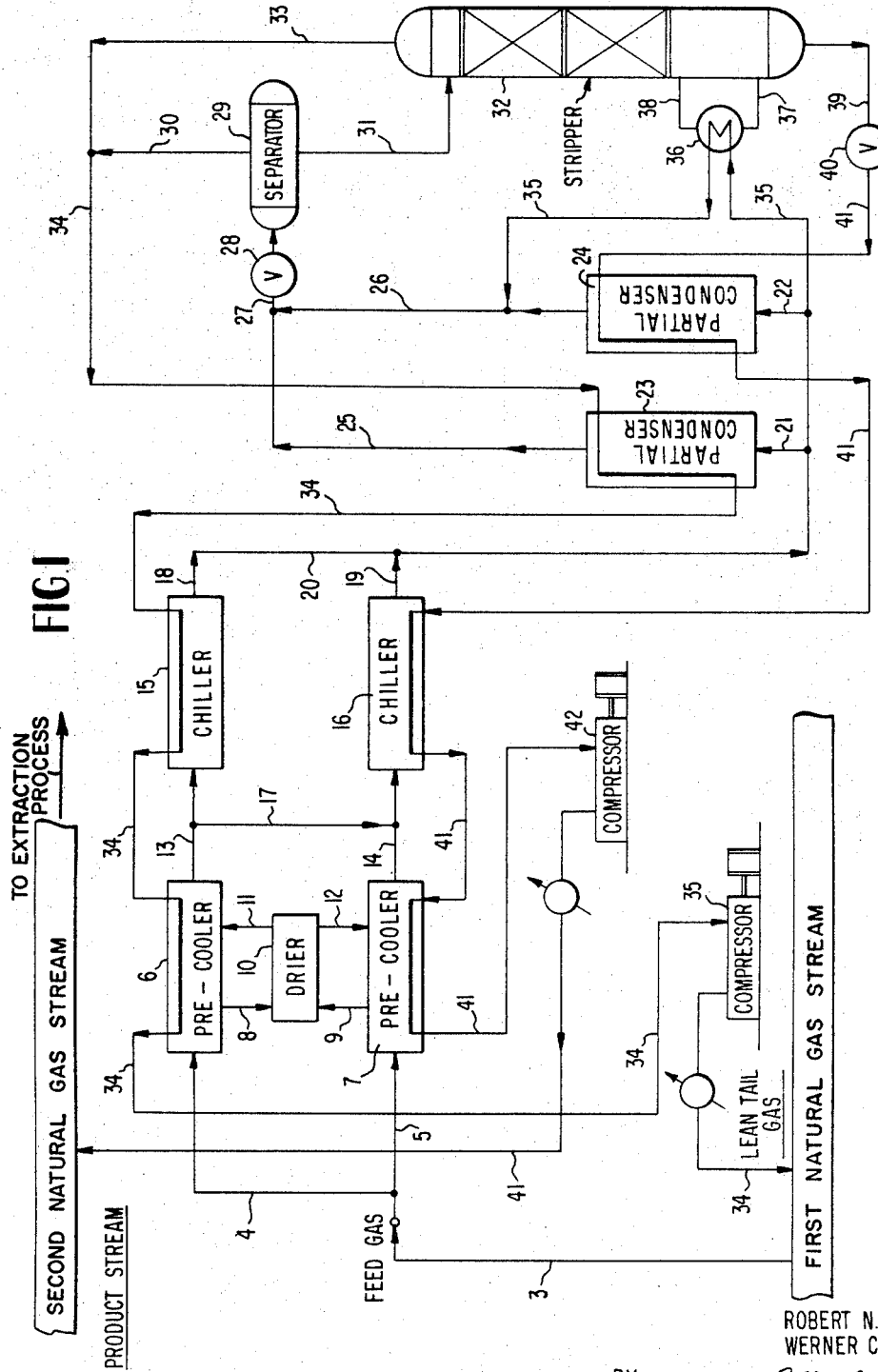

INVENTORS
ROBERT N. DiNAPOLI
WERNER C. MULLER

BY *Allen A. Meyer, Jr.*
ATTORNEY 3,407,613
ENRICHMENT OF NATURAL GAS IN
$C_2+$ HYDROCARBONS
Werner C. Muller, Roslyn, and Robert N. Di Napoli, North Bellmore, N.Y., assignors to National Distillers and Chemical Corporation, New York, N.Y., a corporation of Virginia
Filed Sept. 13, 1966, Ser. No. 579,061
8 Claims. (Cl. 62—11)

ABSTRACT OF THE DISCLOSURE $C_2+$ hydrocarbons are recovered from a first natural gas stream and transferred to a second natural gas stream enriching it. A remaining $C_1$ rich vapor fraction residue passed in heat exchange with the incoming first natural gas stream is returned to the remaining portion of the first natural gas stream while the revaporized $C_2+$ fraction is added to the second natural gas stream flowing to an extraction process.

---

This invention relates to an efficient process for the transfer of hydrocarbons between natural gas pipelines. More particularly the present invention is directed to the transfer of $C_2+$ hydrocarbons from one natural gas stream to another.

Stripped natural gas streams frequently retain a small but valuable proportion of $C_2+$ hydrocarbons occasionally on the order of about 3.5 mole percent. Processes for economically and efficiently recovering this hydrocarbon fraction have recently been developed and are described in copending U.S. patent applications of the same assignee entitled "Low Temperature Process for the Recovery of Ethane from a Stripped Natural Gas Stream." The applications bear Ser. Nos. 546,389, now Patent No. 3,360,946, and 546,398 now Patent No. 3,359,743, were filed on Apr. 29, 1966 in the name of Robert N. Di Napoli.

A recovery plant utilizing the processes described in the noted copending applications represents a very substantial capital investment and requires a large volume natural gas feed for optimum economy.

Many pipelines are of insufficient volume to justify erection of a $C_2+$ hydrocarbon recovery plant to extract ethane and heavier hydrocarbons. Other sources of natural gas are geographically remote from the point of use of the extracted $C_2+$ fraction and the economics of extracting the $C_2$ and heavier hydrocarbons will not justify transporting the product any substantial distance for final processing, such as, cracking and polymerization.

Therefore, it is economically highly desirable to enrich one natural gas stream by transfer of $C_2+$ hydrocarbons from one or more other such streams, to provide a satisfactory feed to a $C_2+$ extraction plant.

The primary object of the present invention is to provide a highly efficient and economical process for the transfer of $C_2+$ hydrocarbons from one or more natural gas streams to another natural gas stream.

A further object of the invention is to accomplish such a transfer at low temperature with minimum condensation of methane and the minimum power requirements for compression and refrigeration.

Other objects and advantages of the invention will be apparent from the following description of the invention.

Figure 2:
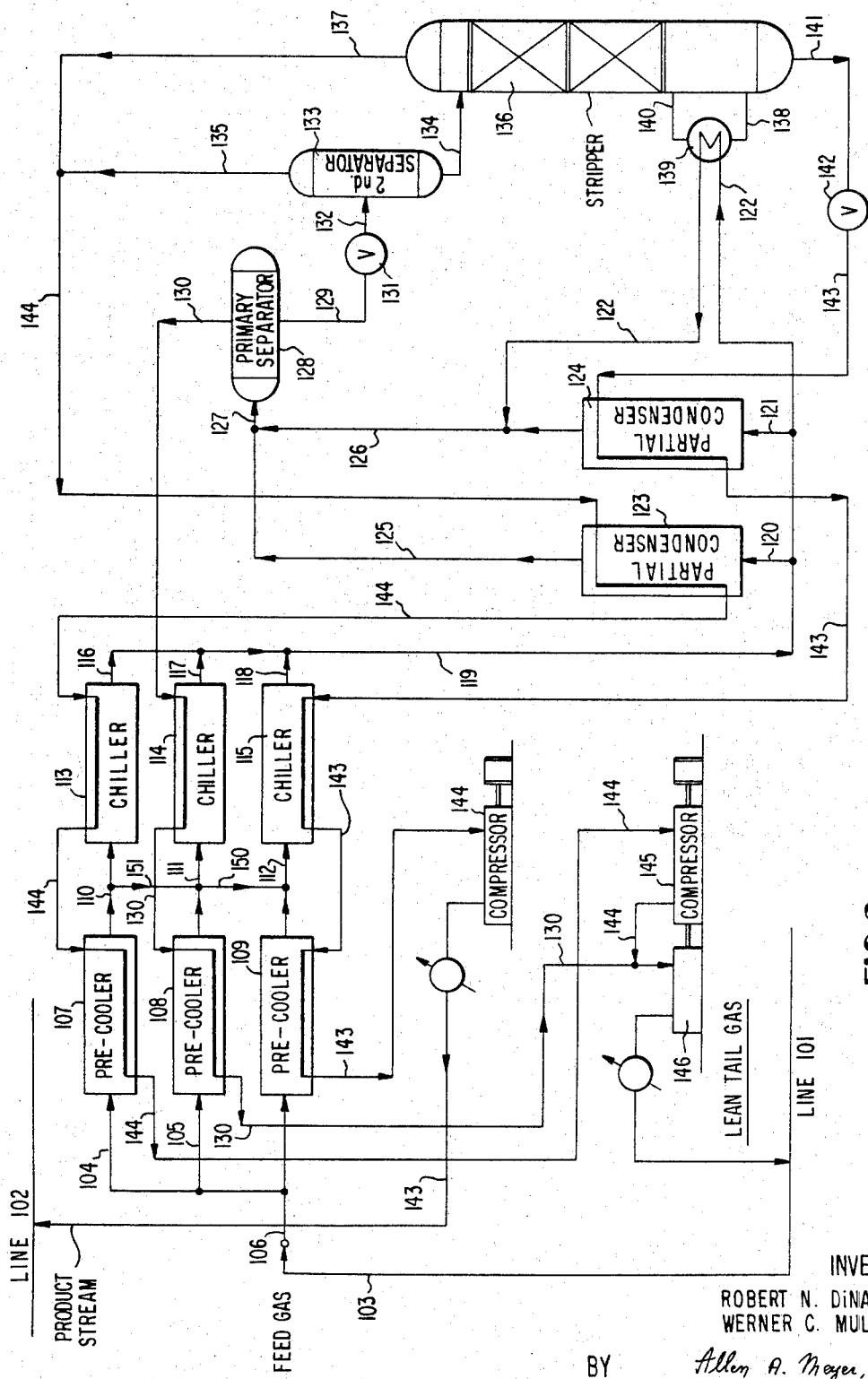

Three preferred systems for carrying out the present invention are schematically illustrated in FIGURES 1 and 2 of the accompanying drawing.

In general, the present invention comprises:

(a) Providing a natural gas feed, from a first pipeline or other source, at a pressure usually above 350 p.s.i.a. and preferably between about 450 p.s.i.a. and 800 p.s.i.a., and at about ambient temperature, (b) Pre-cooling the natural gas feed to a temperature generally on the order of from $-80°$ to $-120°$ F. The pre-cooling may be effected at least in part, by indirect heat exchange with tail gas and product streams, by pressure reduction, as may be accomplished in an expansion engine, or by a combination of heat exchange and expansion, (c) The feed gas is further cooled to a temperature in the range of from $-100°$ to $-130°$ F. to condense a portion of the $C_2+$ hydrocarbons fraction of the feed, (d) The feed gas is then subjected to further pressure reduction to from about 250 to 500 p.s.i.a. and is treated to separate $C_2+$ hydrocarbon condensate from the remaining gas fraction. The step of further pressure reduction may be conducted either before or after the step of separating $C_2+$ condensate. Where pressure reduction is carried out after the separation, the feed is preferably subjected to a further separation step to remove additional condensate. After separation, the $C_2+$ hydrocarbons condensate is preferably treated for stripping of additional methane which is combined with the separated vapor fraction, (e) Warming the vapor fraction by indirect heat exchange with the incoming feed gas, (f) The pressure of the $C_2+$ hydrocarbons condensate is then further reduced to from 150 to 450 p.s.i.a., to cool the fraction for heat exchange with the feed, (g) Re-vaporizing the $C_2+$ hydrocarbons condensate by indirect heat exchange with the incoming feed gas, (h) Re-compressing the re-vaporized $C_2+$ hydrocarbons fraction, if necessary, to the pressure of a second natural gas stream, and (i) Combining said re-vaporized $C_2+$ hydrocarbons fraction with the second natural gas stream to provide a stream enriched in $C_2+$ hydrocarbons.

The use of an expansion engine or other means of pressure reduction in the pre-cooling of the feed gas may be advantageous where the tail gas and/or $C_2+$ hydrocarbon rich vapor product need not be obtained at relatively high pressures. In such cases, as where the tail gas is to be used for local sales, recompression is unnecessary and the loss of pressure in the expander can be tolerated in view of the cooling effect which is gained.

It will be understood that the enriched natural gas stream produced in accordance with the invention may be employed advantageously as the feed to a $C_2+$ extraction plant at a remote station.

It will also be apparent that in accordance with the invention a large number of smaller, widely separated natural gas streams may be employed to furnish $C_2+$ hydrocarbons for enrichment of a single natural gas stream later to be treated for $C_2+$ hydrocarbons extraction.

The present invention is described more in detail in the following paragraphs which refer to the preferred processes illustrated schematically in FIGURES 1 and 2 of the drawings.

Referring to FIGURE 1 of the drawing, a natural gas feed is supplied in pipeline 1 at a pressure above about 350 p.s.i.a. and preferably in the range of from 450 to 800 p.s.i.a. The temperature of the feed gas may vary, but generally is about ambient. The feed gas is removed from pipeline 1 through conduit 3 and is split into two streams in conduits 4 and 5. The gas is fed through conduits 4 and 5 into precoolers 6 and 7 respectively, where the gas is cooled by indirect heat exchange with tail gas and product streams. Concurrently with the precooling, the feed gas is preferably conducted through conduits 8 and 9 to dryer 10 and returned to the pre-coolers through conduits 11 and 12, respectively.

The feed gas is withdrawn from pre-coolers 6 and 7 through conduits 13 and 14, respectively, and is introduced into chillers 15 and 16.

Conduit 17, connecting conduits 13 and 14, allows for redistribution of flow between the two so that proper volumes of gas can be fed to the chillers and the proper temperature can be achieved in the gas streams.

The pre-cooling of the feed gas in pre-coolers 6 and 7 and chillers 15 and 16 reduces the temperature of the feed to the range of from about −80° to −120° F. Cooling in the chillers 15 and 16 is also effected by indirect heat exchange with tail gas and product streams. The feed is then withdrawn from chillers 15 and 16 through conduits 18 and 19, respectively and is combined in conduit 20.

The feed stream is then redivided into three streams in conduits 21, 22 and 35. The feed in conduits 21 and 22 is introduced into partial condensers 23 and 24, respectively. Further cooling of the feed gas in partial condensers 23 and 24 to a temperature of from −100° to −130° F. results in the condensation of a portion of the $C_2+$ hydrocarbon fraction of the feed gas. Cooling in the partial condensers may also be accomplished by indirect heat exchange with tail gas and product streams.

The feed is withdrawn from partial condensers 23 and 24 through conduits 25 and 26 respectively and is recombined in conduit 27.

The feed is then passed through pressure let-down valve 28 which further reduces the pressure of the feed to from about 300 p.s.i.a. to 500 p.s.i.a.

After passing through pressure let-down valve 28, the feed is flashed into separator drum 29 from which a vapor fraction, primarily comprising methane, but also containing some $C_2+$ hydrocarbons, is withdrawn overhead in conduit 30.

The liquid $C_2+$ hydrocarbons condensate is withdrawn from separator 29 through conduit 31 and is introduced into stripper 32. In the stripper, a further separation of methane from the $C_2+$ hydrocarbons is effected. The stripper may be a plate or packed tower unit of conventional construction. Additional vapors primarily containing methane and a small amount of $C_2+$ hydrocarbons is removed overhead from the stripper in conduit 33 and is combined with the vapor fraction from separator 29 in conduit 34.

The portion of the incoming feed gas, separated from the main feed through conduit 35 is introduced into re-boiler unit 36. Heat removed from the feed gas produces the required stripping vapors by vaporizing a portion of the $C_2+$ hydrocarbons condensate circulated through conduits 37 and 38 in the bottom of stripper 32.

The $C_2+$ hydrocarbon condensate from stripper 32 is removed from the bottom of the stripper through conduit 39 and is passed through pressure let-down valve 40 which effects further cooling of the product stream. The product stream exiting from pressure let-down valve 40 is then returned through partial condenser 24 to cool the incoming feed gas by heat exchange and is also recycled through chiller 16 and precooler 7 for the same purpose. In the course of the several heat exchange steps during the return of the $C_2+$ hydrocarbons stream, it is re-vaporized. Therefore, where the product stream is to be returned to a conduit at higher pressure, it is preferably re-compressed in compressor 42 to the appropriate pressure and then combined with a natural gas stream in pipeline 2.

The combined vapor fractions in conduit 34 are then recycled in indirect heat exchange with the incoming feed gas in partial condenser 23, chiller 15 and pre-cooler 6. The tail gas in cnduit 34 may then be re-pressurized in compressor 35 for return to pipeline 1.

EXAMPLE 1

In a system as described above with reference to FIGURE 1 of the drawing, a feed stream of natural gas of the following approximate composition is provided at a pressure of 610 p.s.i.a. and a temperature of 100° F.:

| | Mole percent |
|---|---|
| $CO_2$ | 0.31 |
| $N_2$ | 0.31 |
| $CH_4$ | 96.05 |
| $C_2H_6$ | 3.05 |
| $C_3H_8$ | 0.45 |
| $iC_4H_{10}$ | 0.06 |
| $nC_4H_{10}$ | 0.03 |
| $iC_5H_{12}$ | 0.01 |
| $nC_5H_{12}$ | 0.04 |
| | 100.00 |

The feed stream may also contain some carbon dioxide. Depending on its concentration, the feed gas may be pre-treated by known techniques to remove carbon dioxide or reduce the content below contaminating levels. Feed gas containing concentrations of carbon dioxide in the range of 1 mole percent may be processed without treatment. In this case, the major portion of carbon dioxide will concentrate in the $C_2+$ hydrocarbons product stream.

The volume of the gas feed is 909.6MM s.c.f.d. (million standard cubic feet per day) or 100,000 m.p.h. (moles per hour). The natural gas feed is divided into two streams, the first of which is fed at a rate of 71,465 mph. to pre-cooler 6 and the second of which is fed at a rate of 28,535 m.p.h. to pre-cooler 7. The feed in pre-cooler 6 is circulated through conduit 8 to dryer 10 and is returned to the pre-cooler through conduit 11. While in pre-cooler 6, the feed is cooled by indirect heat exchange with returning tail gas in conduit 34 so that upon withdrawal through conduit 13, the temperature of the feed gas is about −70° F. The gas in pre-cooler 7 is also circulated through conduit 9 to dryer 10 and is returned to pre-cooler through conduit 12. While in pre-cooler 7, the gas is cooled by indirect heat exchange with returning product stream in conduit 41. Upon leaving pre-cooler 7 through conduit 14, the feed gas is at a temperature of −70° F.

A portion of the feed gas in conduits 13 is transferred through conduit 17 to conduit 14 and is then introduced into chiller 16. The remaining portion of feed gas in conduit 13 is introduced into chiller 15. The feed to chiller 15 is at the rate of 62,258 m.p.h. and to chiller 16 at the rate of 37,742 m.p.h. In chillers 15 and 16, the feed gas is cooled by indirect heat exchange with tail gas and product streams respectively. The feed gas is withdrawn from chiller 15 through conduit 18 and from chiller 16 through conduit 19 and is combined in conduit 20. At this point, the temperature of the feed gas is approximately −100° F.

By suitable valves, not shown, the feed gas in conduit 20 is divided into three streams in conduits 21, 22 and 35. The feed gas in conduit 21 is introduced into partial condenser 23 at a rate of 24,028 mph. In chiller 23, the feed gas is further cooled by indirect heat exchange with recycled tail gas to a temperature of about −116° F. This results in a partial condensation of a $C_2+$ hydrocarbon fraction from the lighter vapors. The feed gas in conduit 22 is introduced into partial condenser 24 and is likewise subjected to additional cooling, in this instance, by indirect heat exchange with the recycled products stream.

The portion of the feed gas stream in conduit 35 is used to supply heat in re-boiler 36 of methane stripper 32 and is recombined with the stream exiting from partial condenser 24 in conduit 26.

The feed gas from partial condensers 23 and 24 withdrawn through conduits 25 and 26 is combined in conduit 27. The combined stream is then passed through let-down valve 28 and is flashed into separator drum 29 to reduce the pressure of 490 p.s.i.a. and the temperature to about −126° F. Additional condensation of $C_2+$ hydrocarbons takes place after pressure let-down and the condensate is withdrawn from separator 29 through conduit 31 and is fed to stripper 32 at the rate of about 40,748 mph.

Overhead vapors from separator 29 are withdrawn through conduit 30 at the rate of 59,252 mph. The overhead primarily contains methane and a small amount of $C_2+$ hydrocarbons.

In stripper 32, about 50% of the methane content of the $C_2+$ hydrocarbons fraction is boiled off. Either a plate or packed tower stripper is suitable. A portion of the $C_2+$ hydrocarbons condensate gravitating to the bottom of stripper 32 is reboiled by being withdrawn through conduit 37 passed through re-boiler 36, and returned to the stripper through conduit 38. In the re-boiler, the $C_2+$ hydrocarbon condensate is warmed by indirect heat exchange with feed gas introduced and withdrawn through conduit 35. The warming causes vaporization of a portion of the $C_2+$ hydrocarbons fraction, which contacts the liquid condensate entering the tower and selectively boils off methane.

The product stream withdrawn from the bottom of stripper 32 is at a pressure of approximately 495 p.s.i.a. and a temperature of about $-122°$ F. The product stream in conduit 39 is passed through let-down valve 40 which reduces the pressure of the stream to about 405 p.s.i.a. and reduces the temperature to about $-133°$ F.

The product stream in conduit 41 is then recycled through partial condenser 24 for indirect heat exchange cooling of the feed gas in the partial condenser and is withdrawn from the unit at a temperature of about $-108.3°$ F. The product stream then is introduced into chiller 16 for additional cooling of the feed gas and exits from the chiller at a temperature of about $-78.5°$ F. The product stream is then recycled through pre-cooler 7 for indirect heat exchange with the feed gas and is withdrawn from the pre-cooler at a temperature of about 92° F. and a pressure of about 390 p.s.i.a. The product stream is then re-compressed in compressor 42 to a pressure of about 610 p.s.i.a. and is transferred through conduit 41 to pipeline 2. The hydrocarbon transfer product obtained under the conditions of the example is 199.2MM s.c.f.d. or 418,537 pounds per hour.

Overhead vapors from stripper 32 are withdrawn through conduit 33 and combined with overhead vapor from separator 29 and conduit 30 in conduit 34. The overhead from the stripper is at a temperature of about $-126.6°$ F. and is flowing at a rate of 18,847 mph. The combined stream in conduit 34 is at a temperature of about $-126.2°$ F. and has a flow rate of 78,099 mph.

The tail gas in conduit 34 is recycled through partial condenser 23 for indirect heat exchange cooling of the incoming feed gas. The tail gas exits from the partial condenser at a temperature of about $-110°$ F. and is then passed through chiller 15 for further heat exchange with the incoming gas. The tail gas is withdrawn from chiller 15 through conduit 34 at a temperature of $-78°$ F. and is introduced into pre-cooler 6. After further cooling of the incoming gas in pre-cooler 6, the tail gas is withdrawn at a temperature of about 92° F. and a pressure of about 475 p.s.i.a. The tail gas is compressed in compressor 35 to a pressure of about 610 p.s.i.a. and may then be returned to pipeline 1 at a rate of 710.4MM s.c.f.d.

As a result of the process, the natural gas stream in pipeline 2 is enriched by about 10% in $C_2+$ hydrocarbons. Where the feed gas ethane content in pipeline 1 is on the order of 3 mole percent, about 73.9% of the ethane is recovered and transferred to the second natural gas stream at the rate of about 66,950 pounds per hour to provide an enriched stream from which $C_2+$ hydrocarbons may economically be extracted.

EXAMPLE 2

Referring now to FIGURE 2 of the drawing, there is schematically illustrated another preferred embodiment of the invention by which about 73.5% of the ethane content of a natural gas stream is recovered and used to enrich a second natural gas stream. This is based on a natural gas tream in line 101 which is lean, that is, has an ethane content on the order of 3 mole percent. A gas feed of the same composition as was used in Example 1 is employed in this instance.

Feed gas from pipeline 101 is withdrawn through conduit 103 and is introduced through conduits 104, 105 and 106 into pre-coolers 107, 108 and 109. The feed is at a temperature of about 100° F. and a pressure of about 610 p.s.i.a. The rate of feed to pre-cooler 107 is 25,920 mph., to pre-cooler 108 is 46,205 mph. and to pre-cooler 109 is 27,875 mph.

The feed in pre-coolers 107 and 108 is cooled to a temperature of $-70°$ F. by indirect heat exchange with recycled tail gas.

The feed gas in pre-cooler 109 is also chilled to $-70°$ F., but by indirect heat exchange with the recycled product stream.

The feed gas is withdrawn from pre-coolers 107, 108 and 109 through conduits 110, 111 and 112 respectively and is introduced into chillers 113, 114 and 115 after flow redistribution through conduits 150 and 151. The rate of feed to chillers, 113, 114 and 115 is 20,703 mph., 49,770 mph. and 29,527 mph., respectively.

The feed gas in chillers 113 and 114 is cooled to about $-105°$ F. by indirect heat exchange with recycled lean tail gas and in chiller 115 the feed is also cooled to about $-105°$ F., but in this case by indirect heat exchange with recycled product stream.

The feed is withdrawn from chillers 113, 114 and 115 through conduits 116, 117 and 118 respectively and the streams in the foregoing conduits are combined in conduit 119.

The feed gas stream in conduit 119 is then re-divided into streams in conduits 120, 121 and 122. The feed in conduit 120 is introduced into partial condenser 123 and the stream in conduit 121 is introduced into partial condenser 124. The feed in partial condenser 123 is cooled by indirect heat exchange with lean tail gas to a temperature of about $-117°$ F. Feed gas in partial condenser 124 is cooled to a temperature of about $-117°$ F. by indirect heat exchange with recycled product stream. As a result, a portion of the $C_2+$ hydrocarbons fraction is condensed in each partial condenser.

The feed gas from conduit 112 is used to provide heat in a re-boiler unit associated with a methane stripper described more fully below. After passing through the re-boiler, the feed in conduit 122 is joined with the feed withdrawn from partial condenser 124 in conduit 126. The feed withdrawn from partial condenser 123 through conduit 125 is then joined with the feed from conduit 126 in common conduit 127.

The feed is flashed into primary separator 128. In the separator, the temperature of the feed is about $-117°$ F. and the pressure about 590 p.s.i.a. A first separation of condensed $C_2+$ hydrocarbons is made and the condensate is withdrawn through conduit 129. Overhead vapors are withdrawn from primary separator 128 through conduit 130. These primarily comprise methane with some $C_2+$ hydrocarbons and are recycled to cool the incoming feed by indirect heat exchange.

The condensed fraction separated in primary separator 128 and withdrawn through conduit 129 is passed through let-down valve 131, by which the pressure is reduced to 485 p.s.i.a. and the temperature to about $-128.2°$ F. The feed is then introduced through conduit 130 to separator 133 where a further separation of $C_2+$ hydrocarbons condensate is made. The condensate is withdrawn from the bottom of the separator through conduit 134 and the overhead vapors largely methane are withdrawn through conduit 135.

The liquid condensate containing $C_2+$ hydrocarbons is introduced into stripper 136 where additional methane is separated and withdrawn through overhead conduit 137.

$C_2+$ hydrocarbon condensate in the bottom of stripper 136 is withdrawn through conduit 138, introduced into re-boiler 139 and returned to the stripper through conduit 140. Heat for the regeneration of the required stripping vapors is provided by indirect heat exchange with incoming feed gas in conduit 122.

$C_2+$ hydrocarbon condensate fraction is withdrawn from stripper 136 through conduit 141 at a temperature of about $-123.2°$ F. and a pressure of 489 p.s.i.a. The product stream is passed through let-down valve 142 which reduces the pressure to about 320 p.s.i.a. and the temperature to about $-147°$ F. The product stream in conduit 143 is then recycled through partial condenser 124 in indirect heat exchange relationship with the incoming feed gas. The product stream exits from partial condenser 124 at a temperature of about $-112°$ F. and is then introduced into chiller 115 for further cooling of the incoming gas by indirect heat exchange. The temperature of the product stream exiting from chiller 115 is about $-79.5°$ F. The product stream is then introduced into pre-cooler 109 for indirect heat exchange cooling of the incoming feed gas and is withdrawn from the pre-cooler at a temperature of about $95°$ F. and a pressure of 305 p.s.i.a. The product stream is re-compressed in compressor 144 to a pressure of 610 p.s.i.a. and is combined with a natural gas stream in pipeline 102 to produce an enriched natural gas stream from which $C_2+$ hydrocarbons may be economically extracted.

Overhead vapors from secondary separator 133 withdrawn through conduit 135 and from stripper 136 withdrawn through conduit 137 are combined in conduit 144 at a temperature of about $-128°$ F. and a pressure of 480 p.s.i.a. The flow rate in conduit 144 is about 28,351 m.p.h. The lean tail gas is then recycled through partial condenser 123 in indirect heat exchange with the incoming feed gas and is withdrawn from the partial condenser at a temperature of about $-115°$ F. The lean tail gas is then passed through chiller 113 for further cooling of the incoming gas and is withdrawn at a temperature of about $-78°$ F. Then the lean tail gas is passed through pre-cooler 107 for additional indirect heat exchange with the incoming feed gas and is withdrawn from the pre-cooler at about $92°$ F. at a pressure of 465 p.s.i.a.

Overhead vapors withdrawn from the primary separator 128 through conduit 130 are recycled through chiller 114 for indirect heat exchange cooling of the incoming feed gas. The tail gas vapors in conduit 130 are withdrawn from chiller 114 at a temperature of about $-78°$ F. and introduced to pre-cooler 108 for indirect heat exchange of the incoming feed gas in the pre-cooler. The gas is then withdrawn from pre-cooler 108 through conduit 130 at a temperature of about $92°$ F. and a pressure of about 575 p.s.i.a.

The tail gas in conduit 144 is compressed in compressor 145 up to the pressure of the gas in conduit 130 and is then combined with the gas in conduit 130 and introduced into compressor 146 which brings the vapors up to pipeline pressure, about 610 p.s.i.a. The re-pressurized tail gas is then returned to pipeline 101.

In accordance with the process just described, about 73.5% of the ethane content of the natural gas stream in pipeline 101 is removed and transferred to the natural gas stream in pipeline 102 at the rate of about 66,560 pounds per hour. As noted, this is based on a feed gas in pipeline 1 having an ethane content of about 3 mole percent.

It will be understood by those skilled in the art that certain modifications may be made in the process as illustratively described above without departing from the spirit or scope of the invention as expressed in the following claims.

What is claimed is:

1. A method of preparing a natural gas feed stream enriched in $C_2+$ hydrocarbons suitable as a feed stream for the more economic and efficient extraction of said $C_2+$ hydrocarbons comprising transferring a $C_2+$ hydrocarbons fraction from at least one first natural gas stream to a second natural gas stream by:

(a) providing said first natural gas stream at a pressure in excess of about 350 p.s.i.a., (b) pre-cooling a portion of the natural gas in said first stream to a temperature in the range of from about $-80°$ to $-120°$ F., (c) further cooling said first stream portion to condense a portion of the $C_2+$ hydrocarbons fraction of the stream leaving a $C_1$ rich vapor fraction, (d) separating the condensed $C_2+$ hydrocarbons fraction from the vapor fraction of said first stream portion, (e) warming the vapor fraction by indirect heat exchange with the incoming first stream portion to cool said first stream portion, (f) revaporizing the $C_2+$ hydrocarbons condensate of step (c) by indirect heat exchange with the incoming first stream portion to cool said first stream portion, (g) combining said revaporized $C_2+$ hydrocarbons fraction with said second natural gas stream to provide said natural gas feed stream enriched in $C_2+$ hydrocarbons, (h) returning the $C_1$ rich vapor fraction to the remaining portion of said first natural gas stream, and (i) processing the combined streams of step (g) in a $C_2+$ hydrocarbon extraction process to obtain an enriched $C_2+$ hydrocarbon fraction.

2. A method of preparing a natural gas feed stream enriched in $C_2+$ hydrocarbons suitable as a feed stream for the more economic and efficient extraction of said $C_2+$ hydrocarbons comprising transferring a $C_2+$ hydrocarbons fraction from at least one first natural gas stream to a second natural gas stream by:

(a) providing said first natural gas stream at a pressure in excess of about 350 p.s.i.a., (b) pre-cooling a portion of the natural gas in said first stream to a temperature in the range of from about $-80°$ to $-120°$ F., (c) further cooling said first stream portion to condense a portion of the $C_2+$ hydrocarbons fraction of the stream leaving a $C_1$ rich vapor fraction, (d) separating the condensed $C_2+$ hydrocarbons fraction from the vapor fraction of said first stream portion, (e) stripping methane from the separated condensed $C_2+$ hydrocarbons fraction and combining the stripped methane with the previously separated vapor fraction of said first stream portion, (f) warming the combined stripped methane and vapor fraction by indirect heat exchange with the incoming first stream portion to cool said first stream portion, (g) further reducing the pressure of the stripped $C_2+$ hydrocarbons condensate to the range of from about 150 to 450 p.s.i.a., (h) revaporizing the stripped $C_2+$ hydrocarbons condensate of step (e) by indirect heat exchange with the incoming first stream portion to cool said first stream portion, (i) combining said revaporized stripped $C_2+$ hydrocarbons fraction with said second natural gas stream to provide said natural gas feed stream enriched in $C_2+$ hydrocarbons.

(j) returning the combined $C_1$ rich vapor fraction to the remaining portion of said first natural gas stream, and (k) processing the combined streams of step (i) in a $C_2+$ hydrocarbon extraction process to obtain an enriched $C_2+$ hydrocarbon fraction.

3. The method of claim 2 further comprising providing heat for stripping methane from the $C_2+$ hydrocarbon condensate by indirect heat exchange between the condensate and said first stream.

4. The method of claim 2 further comprising accomplishing at least part of the pre-cooling of the first stream by expanding the feed.

5. The method of claim 2 further comprising, after step (c) further reducing the pressure of said first stream to the range of from 250 to 500 p.s.i.a. and then separating condensed $C_2+$ hydrocarbons.

6. The method of claim 2 wherein, in step (c), said first stream is cooled to a temperature in the range of from $-100°$ to $-130°$ F.

7. The method of claim 2 further comprising, before step (d), reducing the pressure of said first stream to condense additional $C_2+$ hydrocarbons and separating said additional $C_2+$ hydrocarbon fraction from the remaining vapor fraction.

8. The method of claim 2 further comprising, after step (c), reducing the pressure of said first stream to cool the stream and condense additional $C_2+$ hydrocarbon, then separating the condensed $C_2+$ hydrocarbon fraction as in step (d).

References Cited

UNITED STATES PATENTS

| 2,209,534 | 7/1940 | Moore | 62—11 |
| 2,535,148 | 12/1950 | Martin et al. | |
| 2,557,171 | 6/1951 | Bodle et al. | |
| 2,973,834 | 3/1961 | Cicalese. | |
| 3,285,719 | 11/1966 | Bodle et al. | |
| 3,292,381 | 12/1966 | Bludworth | 62—27 XR |
| 3,318,103 | 5/1967 | Jakob | 62—24 XR |
| 3,331,214 | 7/1967 | Proctor et al. | 62—26 XR |

NORMAN YUDKOFF, *Primary Examiner.*

V. W. PRETKA, *Assistant Examiner.*